(12) United States Patent
Kurosaki et al.

(10) Patent No.: US 7,746,430 B2
(45) Date of Patent: Jun. 29, 2010

(54) REFLECTIVE LIQUID CRYSTAL DISPLAY DEVICE OF LAMINATION TYPE WHEREIN THE DIFFERENCE IN ORIENTATION REGULATING FORCE RESULTS WHETHER OR NOT THE ORIENTATION FILM IS PRESENT

(75) Inventors: Yoshihisa Kurosaki, Kawasaki (JP); Toshiaki Yoshihara, Kawasaki (JP); Junji Tomita, Kawasaki (JP); Masaki Nose, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 195 days.

(21) Appl. No.: 11/964,429

(22) Filed: Dec. 26, 2007

(65) Prior Publication Data

US 2008/0137009 A1 Jun. 12, 2008

Related U.S. Application Data

(63) Continuation of application No. PCT/JP2005/012688, filed on Jul. 8, 2005.

(51) Int. Cl.
 *G02F 1/1335* (2006.01)
(52) U.S. Cl. .................. 349/113; 349/129; 349/130
(58) Field of Classification Search .................. 349/113, 349/129, 130
 See application file for complete search history.

(56) References Cited

U.S. PATENT DOCUMENTS

| 5,574,593 | A | 11/1996 | Wakita et al. | |
|---|---|---|---|---|
| 6,538,711 | B2 | 3/2003 | Funahata et al. | |
| 6,597,419 | B1 * | 7/2003 | Okada et al. | 349/104 |
| 2002/0027630 | A1 | 3/2002 | Yamada et al. | |
| 2002/0027631 | A1 | 3/2002 | Saitoh et al. | |
| 2002/0109812 | A1 * | 8/2002 | Takami et al. | 349/113 |
| 2003/0071936 | A1 * | 4/2003 | Niiyama et al. | 349/73 |
| 2003/0156089 | A1 | 8/2003 | Yamakawa et al. | |
| 2005/0007015 | A1 | 1/2005 | Yokoyama et al. | |
| 2005/0244590 | A1 * | 11/2005 | Hiji et al. | 428/1.1 |

FOREIGN PATENT DOCUMENTS

| CN | 1246634 A | 3/2000 |
|---|---|---|
| EP | 0754962 A2 | 1/1997 |
| JP | 9-218422 A | 8/1997 |
| JP | 1031205 A1 | 2/1998 |
| JP | 2002-14346 A | 1/2002 |
| JP | 2002116461 A | 4/2002 |
| JP | 2005-11793 A | 1/2005 |

OTHER PUBLICATIONS

Chinese Office Action dated Apr. 16, 2009, issued in corresponding Chinese Patent Application No. 2001-395370.
International Search Report of PCT/JP2005/012688, date of mailing Oct. 25, 2005.
Supplementary European Search Report mailed Feb. 23, 2010 for European Patent Application EP 05 75 8239.

* cited by examiner

*Primary Examiner*—John Heyman
(74) *Attorney, Agent, or Firm*—Fujitsu Patent Center

(57) ABSTRACT

A high-contrast reflective liquid crystal display device of a lamination type in which scattering in the focal conic state of cholesteric liquid crystal has been reduced is described. The reflective liquid crystal display device has two or more laminated liquid crystal panels respectively having a liquid crystal layer of the cholesteric liquid crystal having different selective reflection wavelengths and the liquid crystal panel having a liquid crystal layer into which the liquid crystal having a longer selective reflection wavelength has been implanted has a smaller orientation regulating force of the liquid crystal layer applied to the panel.

8 Claims, 6 Drawing Sheets

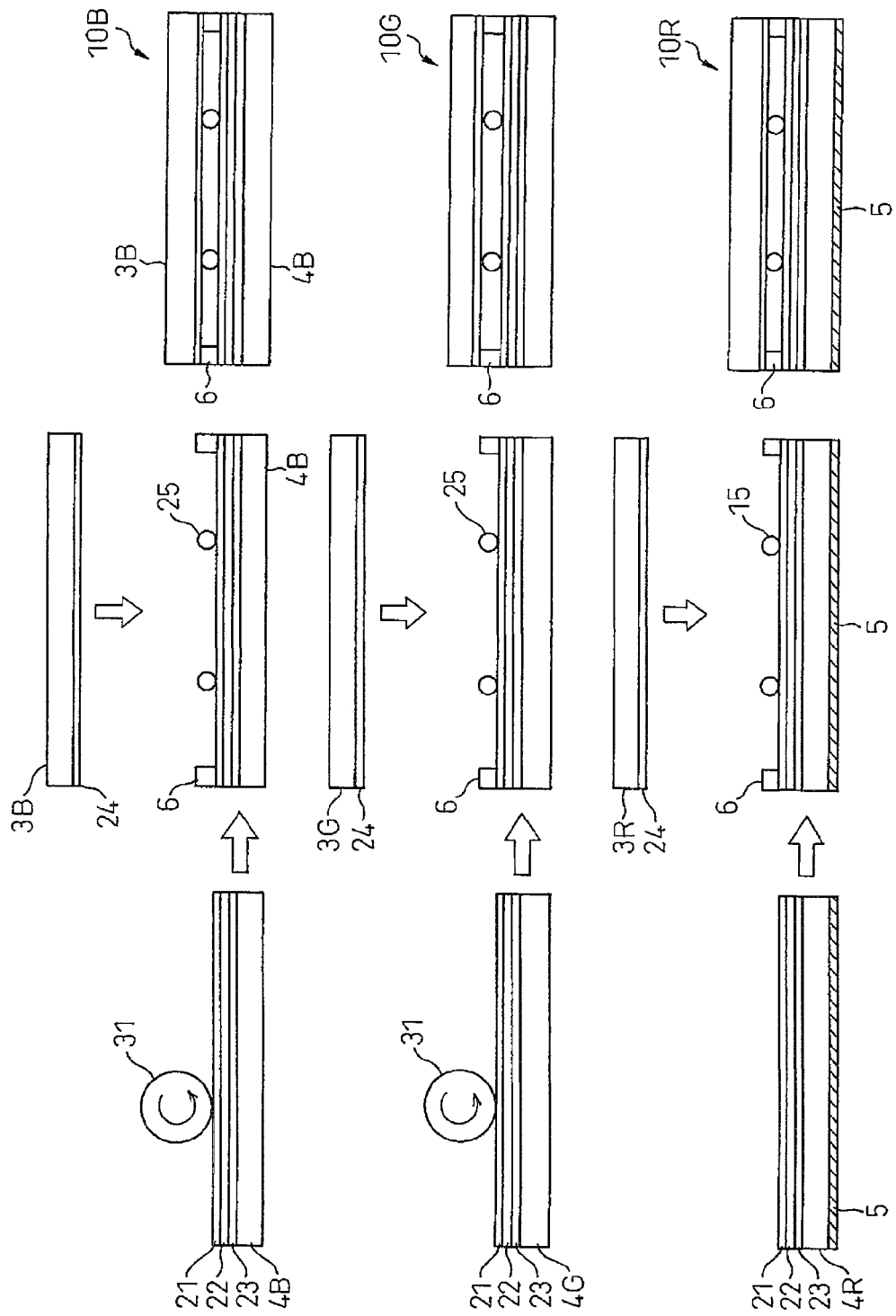

REFLECTIVE LIQUID CRYSTAL DISPLAY DEVICE OF LAMINATION TYPE WHEREIN THE DIFFERENCE IN ORIENTATION REGULATING FORCE RESULTS WHETHER OR NOT THE ORIENTATION FILM IS PRESENT

CROSS-REFERENCE TO RELATED APPLICATION

This application is a continuation application and is based upon PCT/JP2005/012688, filed on Jul. 8, 2005.

BACKGROUND OF THE INVENTION

The present invention relates to a reflective liquid crystal display device of lamination type, and more specifically, to a reflective liquid crystal display device of lamination type in which two or more liquid crystal panels each having a liquid crystal layer of cholesteric liquid crystal having different selective reflection wavelengths are laminated.

Recently, the technical field of electronic paper that can be displayed and held without a power supply and electrically rewritten has been rapidly developing. Electronic paper is aimed at realizing an extremely low power consumption capable of a memory display even if the power supply is turned off, a reflective display gentle to on eyes, which does not tire the eyes, and a flexible, thin display device like paper for applications such as electronic books, electronic news papers, electronic posters, etc. As display systems, the electrophoresis system in which charged particles are moved in air or liquid, the twist ball system in which charged particles classified by two colors are rotated, the organic EL system, and the bistable cholesteric liquid crystal system of selective reflection type that utilizes the interference reflection of a liquid crystal layer are being developed.

Among these various systems, the cholesteric liquid crystal system has an advantage of "memory function", "low power consumption", "colorization", etc. In particular, the cholesteric liquid crystal system is overwhelmingly advantageous in producing a color display. In systems other than the cholesteric liquid crystal system, color filters classified by three colors need to be arranged for each pixel, and therefore, the brightness is ⅓ at the maximum, which corresponds to the three laminates, and those systems are not practical. In contrast to this, in the cholesteric liquid crystal system, colors are reflected by the interference of liquid crystal, and therefore, a color display can be produced just by lamination and there is an advantage in that a brightness of nearly 50% or more can be obtained. A color display device that adopts the cholesteric liquid crystal system is described, for example in Patent document 1 (Japanese Unexamined Patent Publication (Kokai) No. 2002-116461).

FIG. 1A and FIG. 1B are diagrams explaining the principle of a display by cholesteric liquid crystal. As shown schematically, the panel has a configuration in which a liquid crystal layer 1 is sandwiched and held between transparent substrates 3 and 4. Substrate 3 is the substrate on the display surface side. On the surface outside substrate 4, a black light absorbing layer 5 is provided. The cholesteric liquid crystal has two stable states: one state in which the liquid crystal forms layers parallel to the substrate surface; and another state in which the liquid crystal forms layers perpendicular to the substrate surface. The two states can be switched electrically and are characterized by bistability by which the two states can be held without supply of power.

As shown in FIG. 1A, when high voltage is applied to an electrode (not shown) provided on substrates 3 and 4, the spiral axes of liquid crystal molecules 2 linked spirally are oriented in the direction perpendicular to substrates 3 and 4 and a state is brought about in which layers are parallel to the substrate surface. This state is called a planar state. The liquid crystal layer in the planar state selectively reflects (selective reflection) light having a wavelength in accordance with the spiral pitch of the liquid crystal molecules, exhibiting a specific color and a reflective display is produced, which is a light state (reflective state). Presently, reflected light is either right-circular polarized light or left-circular polarized light depending on the direction of rotation of the spiral pitch.

A wavelength at which the reflection is maximum is expressed by the following expression, where n is the average refractive index of the liquid crystal and p is the spiral pitch.

$$\lambda = n \cdot p$$

On the other hand, a reflection band $\Delta\lambda$ increases according to the refractive index anisotropy $\Delta n$.

In contrast to this, as shown in FIG. 1B, when low voltage is applied to the electrode provided on substrates 3 and 4, a state is brought about in which the spiral axes of liquid crystal molecules 2 linked spirally are oriented in the direction parallel to substrates 3 and 4. This state is called a focal conic state. In the focal conic state, interference reflection does not occur, and therefore, the light incident on the device is transmitted and absorbed by light absorbing layer 5 of substrate 4, which is a dark state (transmitting state). In the reflective state, the light that is not reflected is just transmitted through the liquid crystal layer, and it is therefore possible to synthesize a reflective color by arranging liquid crystal layers that reflect different colors in the lower layer.

Because of interference reflection, light reflected in the light state differs depending on the wavelength. Because of this, it is possible to obtain panels of reflected light which exhibit red (R), green (G), and blue (B) by setting the spiral pitch of the liquid crystal.

FIG. 2 is a diagram showing an outline of a color cholesteric liquid crystal display device that has an enabled color display by laminating three panels. As shown schematically, in the order from the display surface side, a blue (B) panel 10B, a green (G) panel 10G, and a red (R) panel 10R are laminated and thus a liquid crystal display device 9 is configured. A drive circuit 11 is connected to the electrode of each panel via flexible cables 12B, 12G, 12R. By applying voltage to the electrode of each panel from drive circuit 11, it is possible to put a cell corresponding to the electrode of each panel into a light state and dark state, and thus an image can be displayed. Each panel comprises a matrix electrode and can produce a dot matrix display.

FIG. 3 is a diagram showing a sectional view of the liquid crystal display device 9 in FIG. 2. The electrode is not shown schematically. Each of panels 10B, 10G, 10R has a configuration in which each of liquid crystal layers 1B, 1G, 1R is sandwiched and held between transparent substrates 3 and 4 and the liquid crystal layer is sealed by a seal 6. Panels 10B, 10B, 10R are arranged in the order from the display surface side and panels 10B, 10G are adhered by a first adhesion layer 7 and panels 10G, 10R are adhered by a second adhesion layer 8. On the surface outside the substrate on the opposite side of the display surface side of panel 10R, a black light absorbing layer 5 is provided. In the following explanation, panel 10B on the display surface side is referred to as a first (blue) panel and its liquid crystal layer 1B is as a first (blue) liquid crystal layer, panel 10G next to the first panel is referred to as a second (green) panel and its liquid crystal layer 1G as a second (green) liquid crystal layer, and panel 10R next to the second panel is referred to as a third (red) panel and its liquid crystal layer 1R as a third (red) liquid crystal layer.

If first panel 10B is put into the light (reflective) state and the second and third panels 10G, 10R are put into the dark (transmitting) state, a blue display is produced. Similarly, if second panel 10G is put into the light (reflective) state and first and third panels 10B, 10R are put into the dark (transmitting) state, a green display is produced, and if third panel 10R is put into the light (reflective) state and first and second panels 10B, 10R are brought into the dark (transmitting) state, a red display is produced. Further, if first and second panels 10B, 10G are put into the light (reflective) state and third panel 10R is put into the dark (transmitting) state, a cyan display is produced, if second and third panels 10G, 10R are put into the light (reflective) state and first panel 10B is put into the dark (transmitting) state, a yellow display is produced, and if the first and third panels 10B, 10R are put into the bright (reflective) state and the second panel 10G is put into the dark (transmitting) state, a magenta display is produced. If all of the first to third panels 10B, 10G, 10R are put into the bright (reflective) state, a white display is produced and if all of the first to third panels 10B, 10G, 10R are put into the dark (transmitting) state, a black display is produced.

In the reflective liquid crystal display system using the cholesteric liquid crystal, the planar state is functions as the "light state" and the focal conic state functions as the "dark state" as described above. The brightness of the display becomes brighter as the reflectance in the planar state (light state) becomes greater and the contrast becomes higher as the transparency in the focal conic state (dark state) becomes greater.

As described above, the reflected light in the planar state will be either right- or left-circular polarized light, and therefore, reflectance is 50% at the maximum. As one method for realizing a highly bright, a method is known, in which the reflectance in a specific direction (in the direction of observation) is increased by applying an orientation regulating force to the liquid crystal interface, which regulates the orientation of liquid crystal molecules to align the spiral axes of the spiral pitch in the planar state, and causing the selective reflection light to have directivity.

As a method for applying an orientation regulating force, a method for forming an orientation film on the liquid crystal interface and performing a rubbing process on the surface of the orientation film, a method for forming a light orientation film on the liquid crystal interface and irradiating the surface of the light orientation film with ultraviolet light, or a hybrid method combining them is generally known. The orientation regulating force differs depending on whether or not an orientation film or a light orientation film is provided and it also differs depending on the density of the rubbing process on the orientation film or the irradiation strength of the ultraviolet light onto the light orientation film.

By applying the orientation regulating force onto the interface with a cholesteric liquid crystal layer, the selective reflection light in the planar state will become more directional. FIG. 4 is a graph showing a spectral reflectance in the color cholesteric liquid crystal display device in FIG. 3, which is measured in the perpendicular direction when the second green panel 10G is put into the light (reflective) state, the first blue panel 10B and the second red panel are put into the dark (transmitting) state, and illuminated with a incidence angle of 30 degrees. As shown schematically, by performing rubbing, the reflectance curve becomes sharper and the reflectance of the peak wavelength is 50% or higher.

However, if a high-density rubbing process is performed to increase the orientation regulating force, the spiral axis of the cholesteric liquid crystal in the planar state is substantially in the direction of substrate normal, and therefore, light is reflected in a mirror reflection manner, and a problem arises in that the visual angle becomes very narrow. In addition, if the orientation regulating force is made too strong, it becomes difficult to maintain the focal conic state and bistability will be lost.

In order to solve such a problem, in Patent document 1, a mixed state is described, in which a poly-domain state in which the spiral axes of the liquid crystal are tilted somewhat from the substrate normal and their orientations differ randomly and a mono-domain state in which the spiral axes of the liquid crystal are substantially uniform in the direction of the substrate normal coexist in the planar state. Specifically, the rubbing density is increased in the order from the blue panel, the green panel, and the red panel and further the rubbing density on the non-display surface side is made higher than the rubbing density on the display surface side in each panel. In this manner, the liquid crystal layer with a longer selective reflection wavelength is made to have a stronger orientation regulating force.

SUMMARY OF THE INVENTION

The reflective liquid crystal display device of lamination type of the present invention is a reflective liquid crystal display device of lamination type in which two or more liquid crystal panels each having a cholesteric liquid crystal layer with different selective reflection wavelengths and characterized in that a liquid crystal panel having a liquid crystal layer into which liquid crystal with a longer selective wavelength is made to have a smaller orientation regulating force of the liquid crystal layer applied to the panel.

BRIEF DESCRIPTION OF THE DRAWINGS

FIG. 6 is a diagram explaining a structure of a cholesteric liquid crystal display device and a manufacturing method in an embodiment of the present invention.

DESCRIPTION OF THE PREFERRED EMBODIMENTS

The present inventors have examined the principle of the present invention, and it is explained using FIG. 5A to FIG. 5D.

Figure 5A:
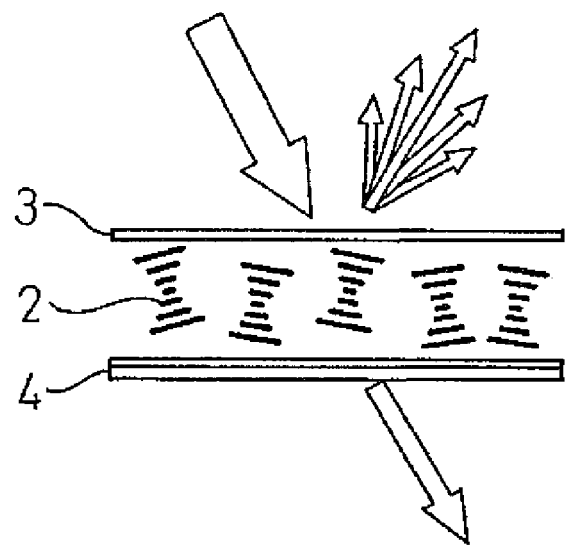
FIG. 5A is a diagram explaining the principle of the present invention.

In a state in which no orientation film or light orientation film is provided, a state in which even if an orientation film is provided, but rubbing is not performed or the rubbing density is low, and a state in which even if a light orientation film is provided, but no ultraviolet light is irradiated or the irradiation strength is weak and therefore the orientation regulating force is weak, as shown in FIG. 5A, in the planar state, the spiral axes of liquid crystals are tilted in random orientations from the substrate normal. Because of this, the reflected light is distributed in a wide angle. This state is a state of easy visualization from the standpoint of the visual angle; however, it is not a state in which the strength of reflected light is sufficient.

Figure 5B:
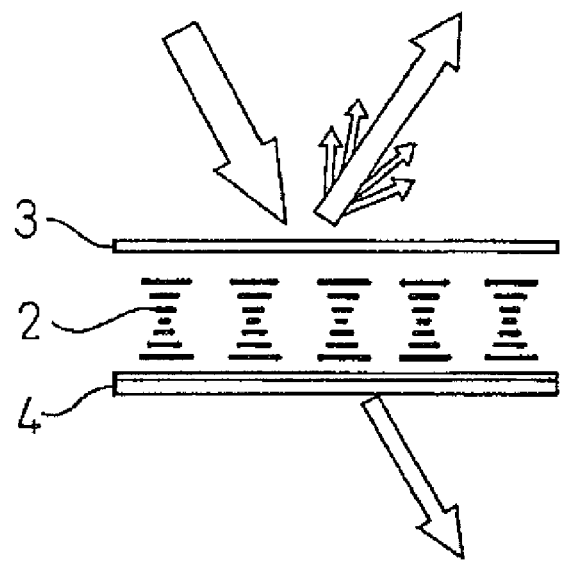
FIG. 5B is a diagram explaining the principle of the present invention.

Because of this, an orientation film or a light orientation film is formed on the surface (inner surface) in contact with the liquid crystal layer of the substrates 3 and 4 of the panel and the rubbing process or the irradiation of ultraviolet light is performed to apply an orientation regulating force. Due to this, as shown in FIG. 5B, in the planar state, the spiral axes of the liquid crystal are in the direction of the substrate normal and the directivity of the reflected light is enhanced; however, the reflectance in the direction increases. The directivity of the reflected light changes depending on the strength of the orientation regulating force.

When the directivity of the reflected light becomes considerably strong, a problem arises in that visual recognizability becomes less because of mirror reflection. Because of this, the orientation regulating force is set properly so that high reflectance (brightness) and visual recognizability are in a proper state.

The influence of the orientation regulating force in the planar state in the panel of each color will be considered. As described above, the longer the selective reflection wavelength of the cholesteric liquid crystal layer, the longer is the pitch of the spiral axis of the liquid crystal. The orientation regulating force is a force that regulates the direction of the liquid crystal molecules at the end of the spiral axis and generally it can be said that the longer the pitch of the spiral axis, the more likely it is affected. In other words, if the orientation regulating force is the same, the liquid crystal of the first red panel having a longer pitch of the spiral axis of the liquid crystal is oriented more uniformly and the uniformity of the orientation of the liquid crystal is degraded in the order from the green panel to the blue panel.

Figure 5C:
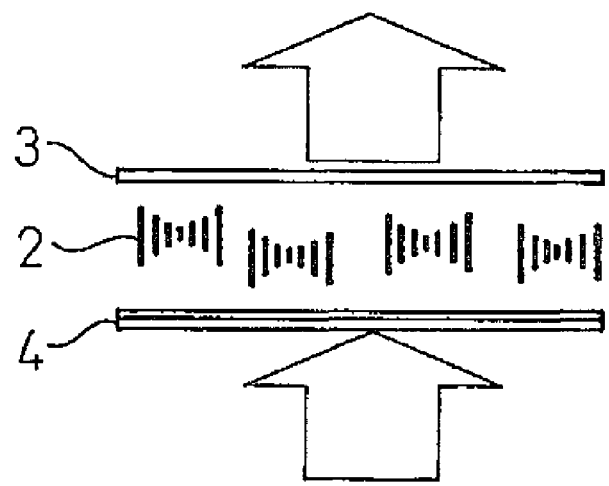
FIG. 5C is a diagram explaining the principle of the present invention.

On the other hand, in the focal conic state, when the orientation regulating force is weak, a state is put about in which the spiral axes of the liquid crystal are parallel to the substrate, as shown in FIG. 5C. Generally, it can be said that in the focal conic state, the liquid crystal molecules are not affected very much by the orientation regulating force; however, they are affected by the orientation state of the liquid crystal in the planar state when the planar state changes to the focal conic state. In other words, when the liquid crystal is oriented uniformly in the planar state by the strong orientation regulating force, it is difficult for the spiral axes of the liquid crystal to become parallel to the substrate when the state changes to the focal conic state because of the strong orientation regulating force and the uniformity in the planar state.

Figure 5D:
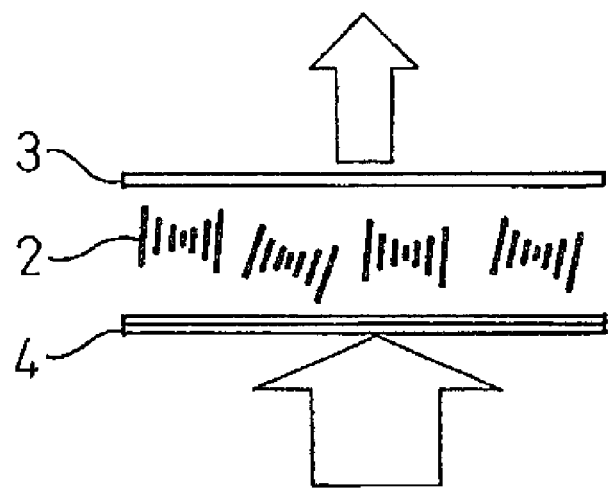
FIG. 5D is a diagram explaining the principle of the present invention.

Because of this, if the state changes to the focal conic state in the panel in which the orientation regulating force is strong, it can be said that a state is brought about, in which the directions of the spiral axes of the liquid crystal vary with respect to the surface of the substrate as shown in FIG. 5D, and the amount of scattered light increases.

In addition, it is also necessary to take into consideration the scattering of light at the interface between the liquid crystal layer and the orientation film, and it can be said that the amount of scattered light at the interface increases if small bumps and dips are produced at the interface between the liquid crystal layer and the orientation film due to the rubbing process.

As described above, in the reflective liquid crystal display device in which two or more cholesteric liquid crystal layers having different selective reflection wavelengths are laminated, if the interface between each liquid crystal panel and the liquid crystal layer is caused to have the same orientation regulating force, brightness can be improved; however, scattering increases particularly in a panel having a long selective reflection wavelength and contrast will be degraded.

Because of this, in the present invention, contrast is prevented from degrading by weakening the orientation regulating force more for the panel particularly having a longer selective reflection wavelength to reduce the scattering in the panel having a long selective reflection wavelength.

Next, the configuration of the reflective liquid crystal display device and the method of manufacturing the same in the embodiment of the present invention will be explained.

Figure 1A:
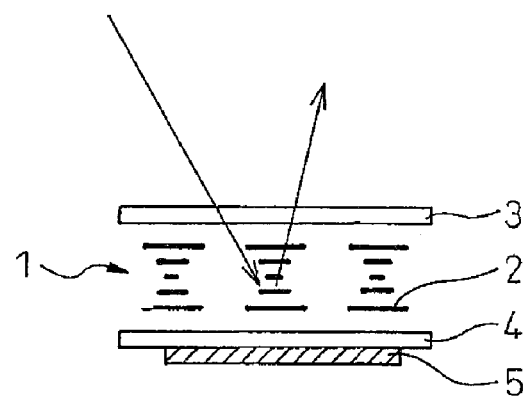
FIG. 1A is a diagram explaining the principle of a display by cholesteric liquid crystal.
Figure 1B:
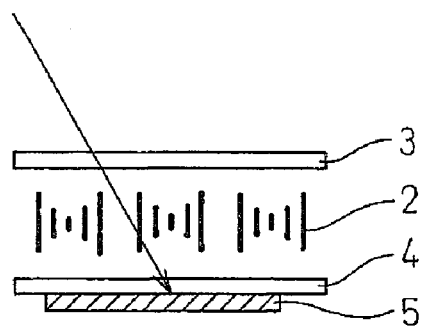
FIG. 1B is a diagram explaining the principle of a display by cholesteric liquid crystal.
Figure 2:
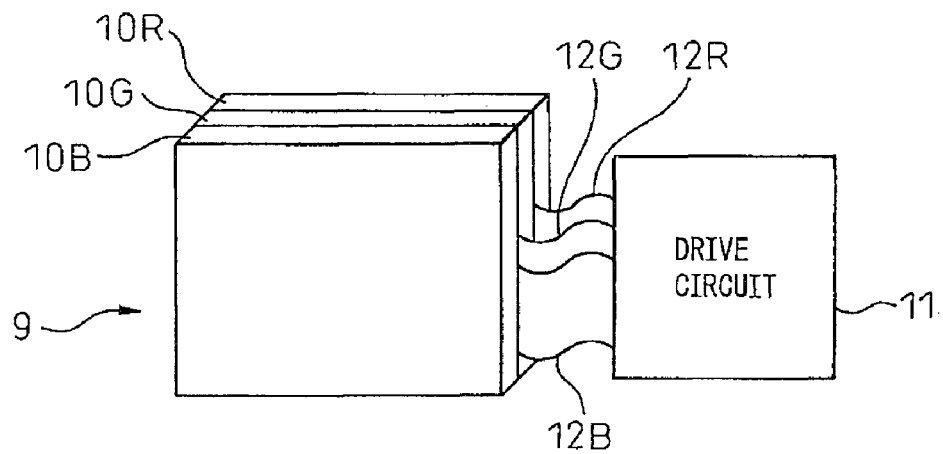
FIG. 2 is a diagram showing an outline of a color cholesteric liquid crystal display device.
Figure 3:
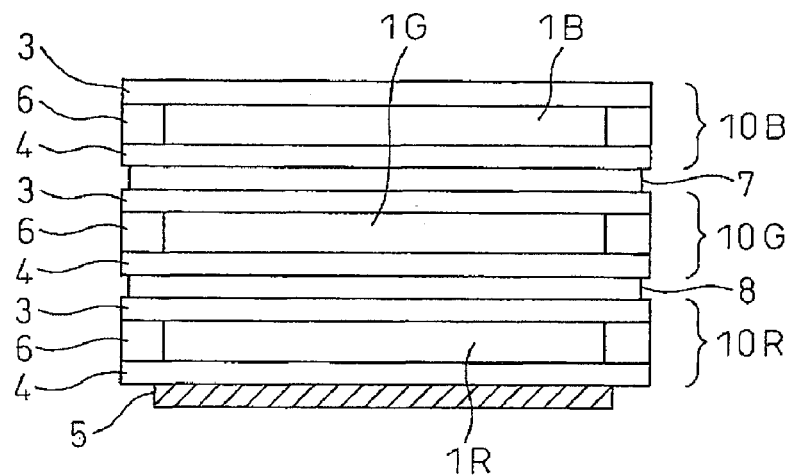
FIG. 3 is a diagram showing a panel structure of a color cholesteric liquid crystal display device.
Figure 4:
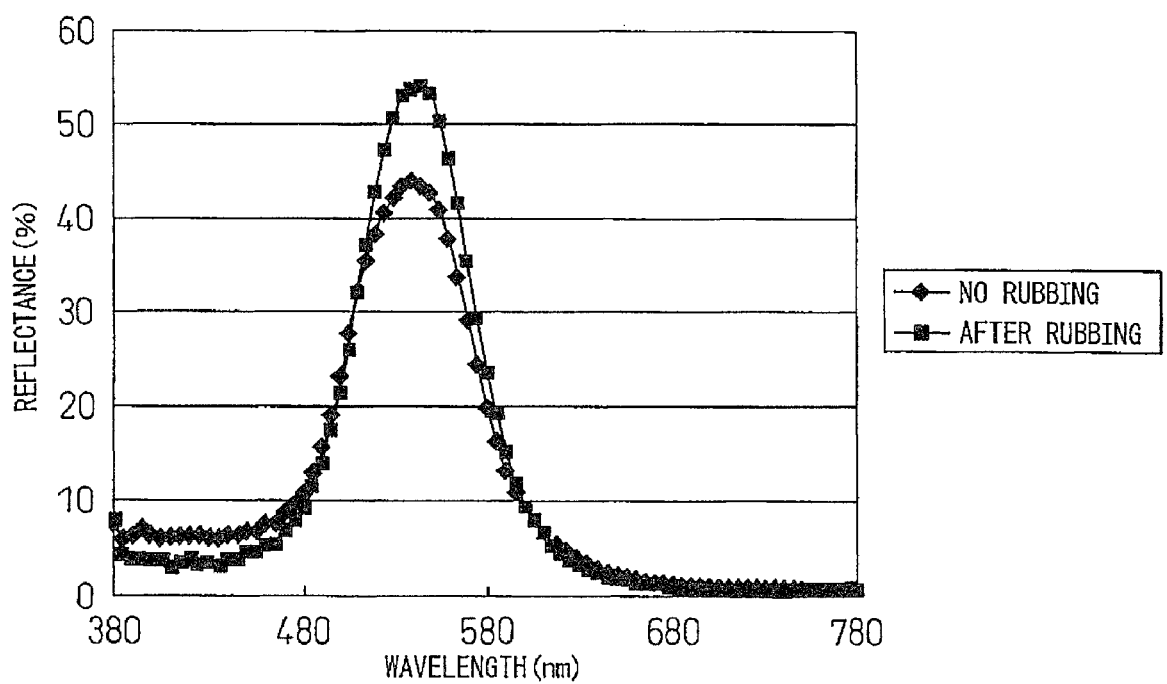
FIG. 4 is a diagram showing an effect of an orientation regulating force in a cholesteric liquid crystal display device.

The reflective liquid crystal display device in the embodiment has a general configuration as shown in FIG. 2. The reflective liquid crystal display device 9 of the present invention used in this device has a panel structure as shown in FIG. 3 and is characterized by the configuration corresponding to the part in contact with the liquid crystal layer of the panel.

Figure 7:
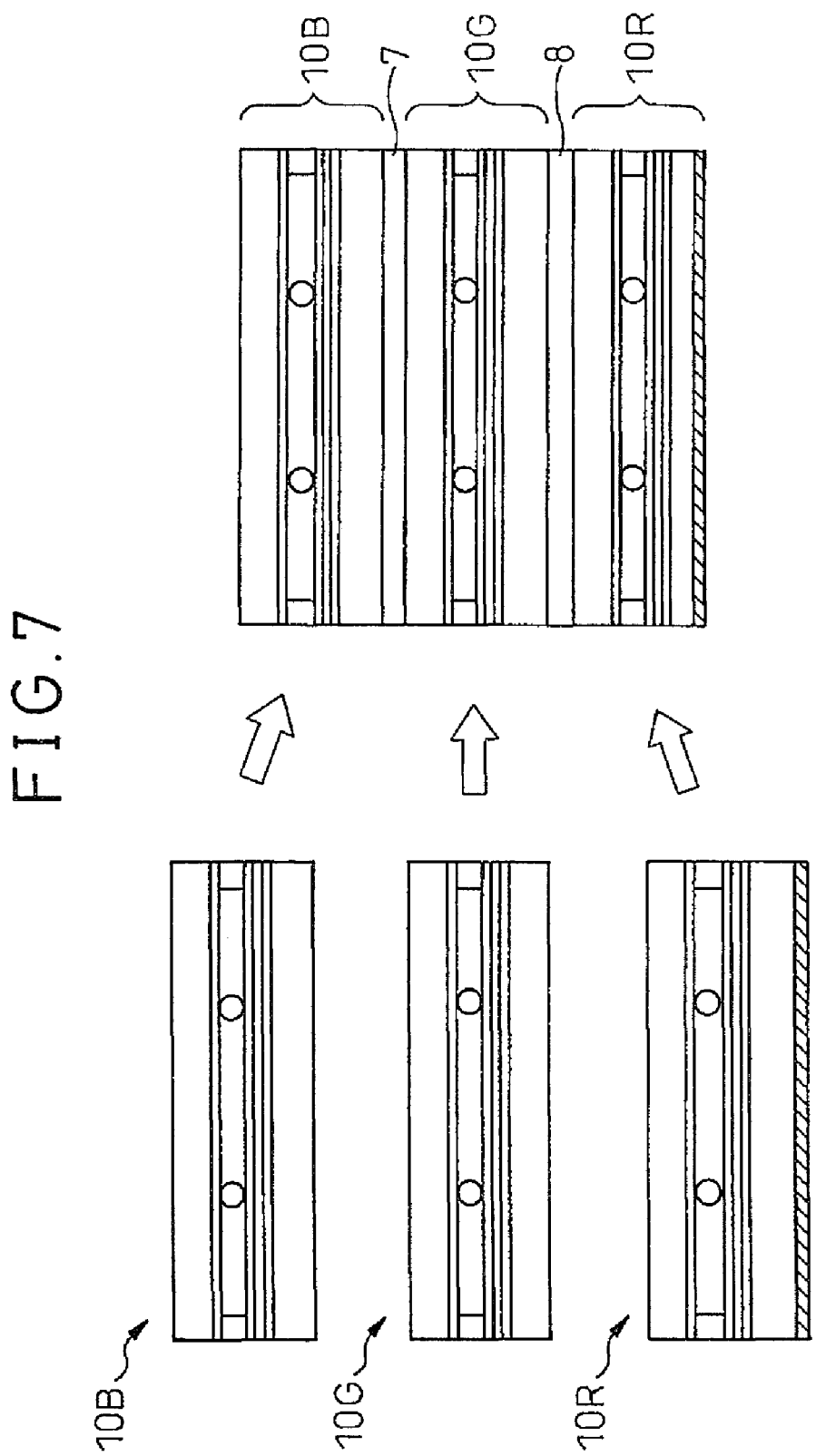
FIG. 7 is a diagram explaining a structure of a cholesteric liquid crystal display device and a manufacturing method in an embodiment of the present invention.

FIG. 6 and FIG. 7 are diagrams showing the configuration of the reflective liquid crystal display device and the method of manufacturing the same in the embodiment.

On a substrate 4B on the opposite side of the display surface of the first blue panel 10B, a substrate 4G on the opposite side of the display surface of the second green panel 10G, and a substrate 4R on the opposite side of the display surface of the third red panel 10R, a transparent electrode layer 23, an insulating layer 22, and an orientation film 21 are formed. The insulating layer 22 is provided in order to protect the transparent electrode layer at the time of assembling and to improve the uniformity of the voltage to be applied to the liquid crystal layer. On the outside surface of the substrate 4R, the black light-absorbing layer 5 is formed.

As shown schematically, the rubbing process is performed on the surface of the orientation film 21 of the substrate 4B and the substrate 4G with a roller 31 of the rubbing device, however, the rubbing process is not performed on the surface of the substrate 4R. The rubbing process is performed once on the surface of the substrate 4B by rotating the roller 31 at 1,200 rpm and setting the amount of thrust of the roller 31 to 0.20 mm. In addition, the rubbing process is performed once on the surface of the substrate 4G by rotating the roller 31 at 900 rpm and setting the amount of thrust of the roller 31 to 0.15 mm. The rubbing density is represented by, for example, rubbing density=number of times×amount of thrust×(1+(2π× roller diameter×rotation speed/60×stage speed)). Therefore, the rubbing density of the substrate 4B is 1.78 times the rubbing density of the substrate 4G. In other words, the orientation regulating force of the substrate 4B is about 1.8 times the orientation regulating force of the substrate 4G. The rubbing process is not performed on the surface of the substrate 4R, the orientation regulating force of the substrate 4R is smaller than the orientation regulating force of the substrate 4G.

In the next process, the seal 6 is provided on the substrate 4B, the substrate 4G, and the substrate 4R and spacers 25 are placed dispersedly.

Separately, a substrate is prepared, in which the transparent electrode layer 23 is formed on each of a substrate 3B on the display surface side of the first blue panel 10B, a substrate 3G on the display surface side of the second green panel 10G, and a substrate 3R on the display surface side of the third red panel 10R. The substrates 3B, 3G, 3R are bonded to the substrate 4G and the substrate 4R as shown schematically.

In the next process, the cholesteric liquid crystal corresponding to each color is implanted into the space inside the panel thus obtained and sealed, thereby the first to third panels 10B, 10G, and 10R are obtained.

Next, as shown in FIG. 7, after the position of the electrode of each panel is aligned, the first to third panels 10B, 10G, and 10R are laminated and fixed via the adhesion layers 7 and 8. In this manner, the reflective liquid crystal display device is completed.

In the above reflective liquid crystal display device, because the rubbing process is not performed on the substrate 3R of the third red panel 10R, the orientation regulating force is the smallest. The orientation regulating force of the second green panel 10G with a small rubbing density is greater than the orientation regulating force of the third red panel 10R, however, smaller than the orientation regulating force of the first blue panel 10B. On the other hand, the liquid crystal layer 1R of the third red panel 10R is more likely to be orientated by the orientation regulating force because the spiral pitch is long, and the liquid crystal layer 1G of the second green panel 10G is more likely to be orientated than the liquid crystal layer 1R; however, it is less likely to be orientated than the liquid crystal layer 1G of the first blue panel 10B, and this order is reverse of the above. Due to this, the state of orientation of all liquid crystal layers 1B, 1G, 1R in the planar state is the same and thus the reflective liquid crystal display device can be obtained, in which brightness has somewhat improved, a small reduction in contrast, and which is suitable for practical use.

The embodiments of the present invention are explained as above; however, various modifications, can be made, i.e., no insulating layer or orientation film provided on substrates 3B, 3G, 3R on the display surface side of each panel; however, they can be provided as in the configuration described in Patent document 1. However, it is desirable, to not provide the insulating layer or the orientation film as in the embodiments from the standpoint that transmittance is improved to reduce scattering. It is possible to obtain sufficient reflection strength even if the insulating layer or the orientation layer is not provided on substrates 3B, 3G, 3R.

In the embodiments, an example is explained, in which the orientation regulating force is made different by the rubbing process; however, it is also possible to make the orientation regulating force different by providing the light orientation film and changing the irradiation strength of ultraviolet light, or to make the orientation regulating force different by combining the rubbing process of the orientation film and the irradiation process of ultraviolet light of the light orientation film. In addition, it is also possible to make the orientation regulating force different by depositing the orientation film obliquely.

We claim:

1. A reflective liquid crystal display device of lamination type comprising:

two or more laminated liquid crystal panels respectively having a liquid crystal layer having different selective reflection wavelengths and exhibiting a cholesteric phase, wherein the liquid crystal panel having a liquid crystal layer to which liquid crystal having a longer selective reflection wavelength has been implanted has a smaller orientation regulating force of the liquid crystal layer applied to the panel, wherein each liquid crystal panel comprises the liquid crystal layer and two substrates that sandwich and hold the liquid crystal layer, wherein at least one of the substrates of at least part of the liquid crystal panel comprises a transparent electrode formed on the surface and an orientation film formed on the transparent electrode, and wherein the difference in the orientation regulating force results from whether or not the orientation film is present.

2. The reflective liquid crystal display device of lamination type as set forth in claim 1, wherein the liquid crystal layer of the liquid crystal panel arranged closer to the display surface side has a shorter selective reflection wavelength, and wherein the liquid crystal panel arranged closer to the display surface side has a larger orientation regulating force of the liquid crystal layer applied to the panel.

3. The reflective liquid crystal display device of lamination type as set forth in claim 1, wherein the difference in the orientation regulating force results from whether or not the rubbing process has been performed on the orientation film and its density.

4. The reflective liquid crystal display device of lamination type as set forth in claim 1, wherein the orientation film is a light orientation film and the difference in the orientation regulating force results from whether or not the light orientation film has been irradiated with ultraviolet beams and its strength.

5. The reflective liquid crystal display device of lamination type as set forth in claim 1, wherein the substrate on the opposite side of the display surface of each liquid crystal panel comprises a lower transparent electrode formed on the surface and the orientation film formed on the lower transparent electrode, and wherein the substrate on the display surface side of each liquid crystal panel comprises an upper transparent electrode formed on the surface but does not have an orientation film.

6. The reflective liquid crystal display device of lamination type as set forth in claim 1, wherein the rubbing process has been performed in a plurality of directions on the orientation film surface of the orientation film of at least part of the liquid crystal panel.

7. The reflective liquid crystal display device of lamination type as set forth in claim 1, wherein the substrate on the opposite side of the display surface of each liquid crystal panel comprises a lower transparent electrode formed on the surface and a light orientation film formed on the lower transparent electrode and a light orientation film formed on the lower transparent electrode, and wherein the substrate on the display surface side of each liquid crystal panel comprises an upper transparent electrode formed on the surface but does not have an orientation film.

8. The reflective liquid crystal display device of lamination type as set forth in claim 1, wherein the ultraviolet beam irradiation process has been performed in a plurality of directions on the orientation film surface of the orientation film of at least part of the liquid crystal panel.

\* \* \* \* \*